April 21, 1925.　　　　　E. E. CAMPBELL　　　　　1,534,916
COUPLING
Filed March 3, 1923　　　　2 Sheets-Sheet 1
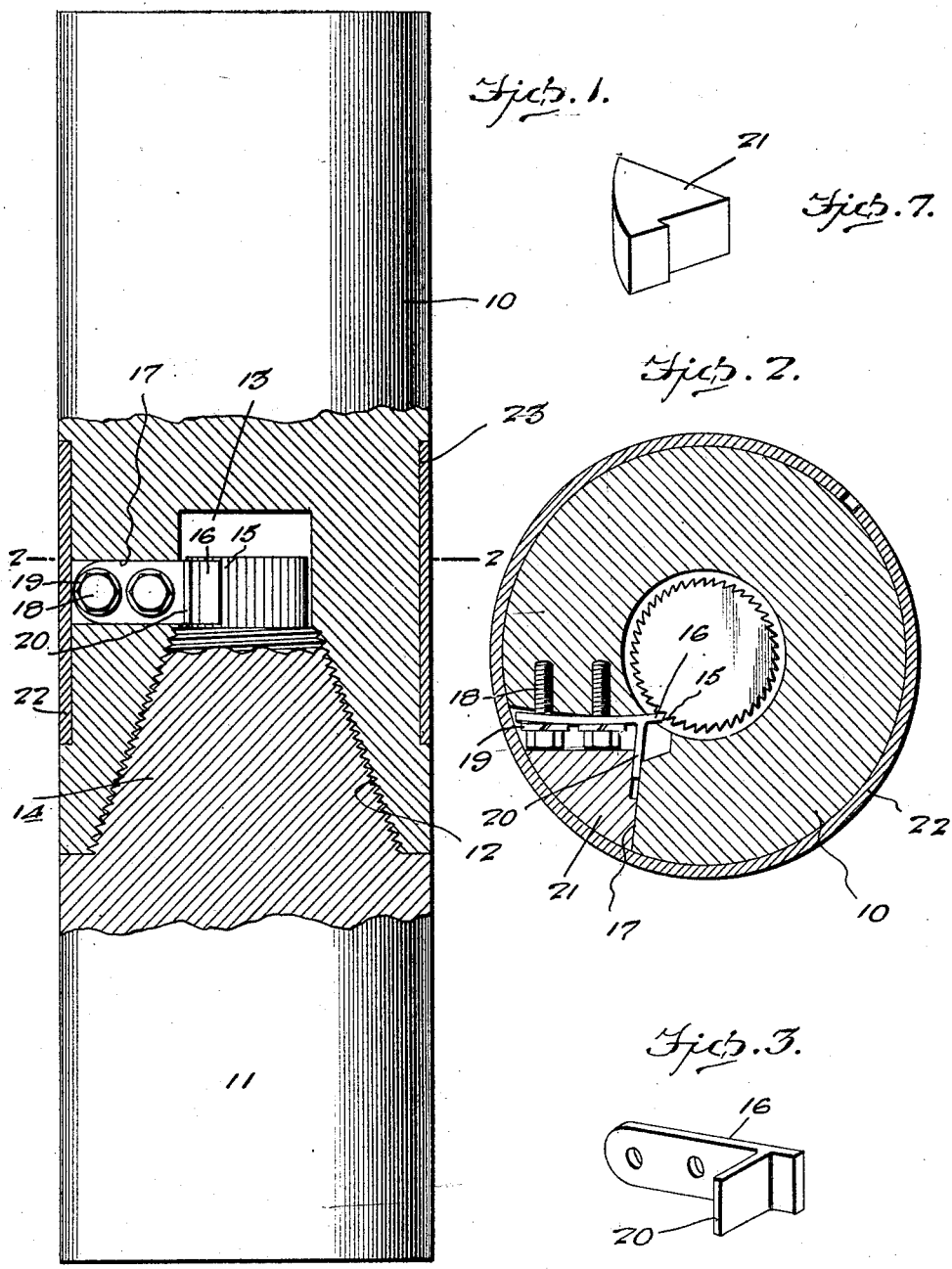

April 21, 1925.                E. E. CAMPBELL                1,534,916
                                  COUPLING
                           Filed March 3, 1923         2 Sheets-Sheet 2
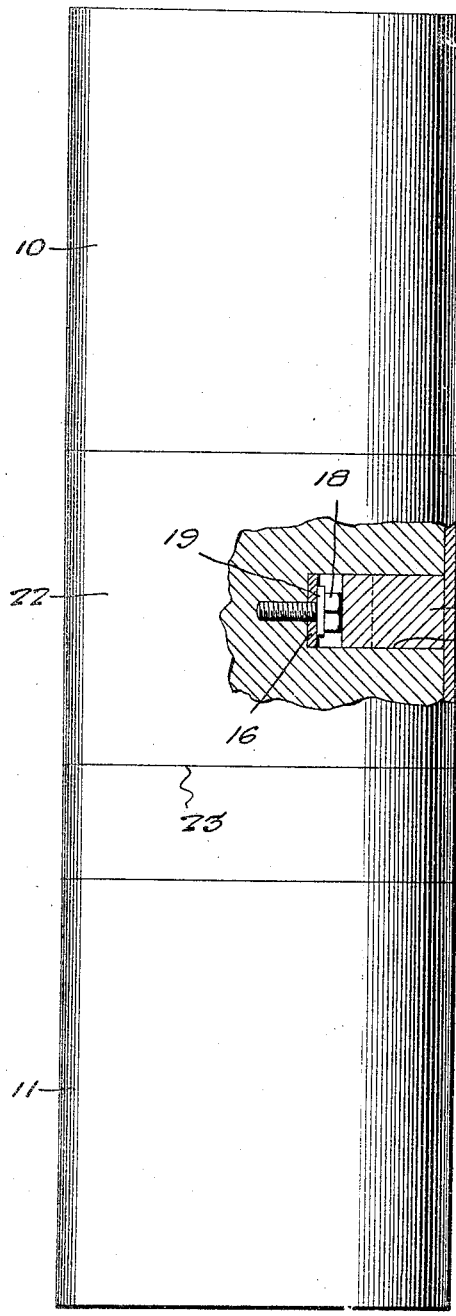
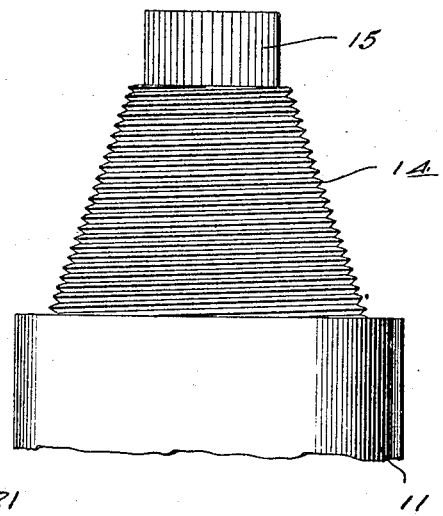
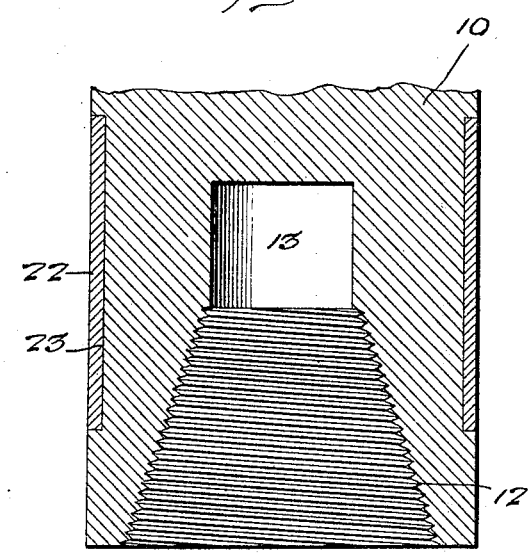
E. E. Campbell INVENTOR Patented Apr. 21, 1925.

1,534,916

UNITED STATES PATENT OFFICE.

EARL EDGAR CAMPBELL, OF GILLETTE, WYOMING, ASSIGNOR OF ONE-HALF TO HARPER LAMAR JARVIS, OF GILLETTE, WYOMING.

COUPLING.

Application filed March 3, 1923. Serial No. 622,604.

*To all whom it may concern:*

Be it known that I, EARL EDGAR CAMPBELL, a citizen of the United States, residing at Gillette, in the county of Campbell and State of Wyoming, have invented new and useful Improvements in Couplings, of which the following is a specification.

This invention relates to couplings and has for an object the provision of means whereby well drilling tools, such as the bit and stem of a drill, pipe sections and the like may be easily and quickly connected in a manner to prevent uncoupling, due to "back lash," incident to the operation of drilling, or from other causes.

Another object of the invention is the provision of a coupling of the above character which includes threadedly connected members and means whereby these members may be held against relative rotation in one direction, but permitted to rotate in an opposite direction, so that the members so connected may be forced tightly together, but held against movement in a reverse direction.

Another object of the invention is the provision of a coupling which is contained wholly within the cross sectional area of the coupled members and which in addition is protected from the action of dirt and sand.

With the above and other objects in view, the invention further includes the following novel features and details of construction, to be hereinafter more fully described, illustrated in the accompanying drawings and pointed out in the appended claim.

In the drawings:—

Figure 1 is an elevation partly broken away showing two members connected in accordance with the present invention.

Figure 2 is a section taken substantially on the line 2—2 of Figure 1.

Figure 3 is a detail perspective view of the dog.

Figure 4 is a view similar to Figure 1, but substantially at right angles thereto.

Figure 5 is a fragmentary elevation of the male member.

Figure 6 is a fragmentary sectional view of the female member.

Figure 7 is a perspective view of the closure plug.

Referring to the drawings in detail, wherein like characters of reference denote corresponding parts, the reference character 10 indicates the female member of the coupling while the male member is indicated at 11.

While the coupling is primarily intended for use in connecting or coupling well drilling tools, pipe and the like, its use is obviously not limited to devices of this character. For purposes of explanation however the coupling may be described in connection with a drill and the female member 10 may represent the drill stem, while the member 11 may represent the bit.

The female member is provided with a socket at one end, whose walls for a portion of their length are tapered and threaded as indicated at 12, while the inner end of the socket is provided with a substantially cylindrical portion 13.

The male member 11 includes an externally threaded tapered end 14 which is designed to threadedly engage the socket of the female member and while the threaded portions 12 and 14 are shown as tapered, this is not essential to the successful functioning of the invention. The extremity of the male member 11 is preferably cylindrical and is designed to be received within the cylindrical portion 13 of the socket of the female member. This cylindrical portion of the male member is provided with axially disposed ratchet teeth 15 which are designed to be engaged by a spring dog 16 carried by the female member 10. For this purpose the female member is provided with a substantially triangularly formed opening 17, which communicates with the bore thereof and the dog 16 is secured to one wall of this opening 17 by fastening devices 18, herein shown in the form of screws which are preferably provided with spring washers 19. Extending from the dog 16 is a plate 20 which is designed to provide a closure for the inner end of the opening 17 so as to exclude sand and dirt during the operation of drilling.

As shown in Figures 1 and 2 of the drawings, the inner end of the dog 16 will engage the teeth 15 of the male member in a manner to permit the latter to rotate in one direction independently of the female member so that the threaded connection between the said members may be tightened, but this dog will hold the male member against independent rotation in an opposite direction. In order to disconnect the members, the inner fastening device 18 may be loosened so as to permit the inner end of the dog to spring outwardly and release from the teeth 15.

As a further means of excluding dirt and sand from the interior of the coupling, there is provided a closure plug 21 of substantially triangular form which is designed for insertion within the opening 17 so as to practically close said opening. This plug is held in place by a split sleeve 22 which is of a resilient character and is normally positioned within an annular groove or channel 23 provided in the outer wall of the female member 10. Due to the resilient character of this sleeve it may be swung out of the groove or channel 23 so as to permit of the removal of the plug 21 and the adjustment of the dog.

The invention is susceptible of various changes in its form, proportions and minor details of construction and the right is herein reserved to make such changes as properly fall within the scope of the appended claim.

Having described the invention what is claimed is:

A coupling of the character described comprising male and female members, respectively, the female member having a tapered threaded socket in one end thereof, said socket having a substantially cylindrical bottom beyond and in registration with the tapered socket, the male member including an externally threaded tapered end adapted to be received and threaded within the socket in the female member, a substantially cylindrical portion provided on the end of the tapered portion of the male member and adapted to be received within the cylindrical portion in the female member, the male cylindrical portion having axially disposed ratchet teeth thereon, the female member having a V-shaped opening in the side thereof communicating with the cylindrical portion, an apertured L-shaped plate secured within the opening in the female member and resting upon two sides thereof, a dog carried by and extending from the inner end of the long arm of the plate and engaging the ratchet teeth on the cylindrical portion of the male member, a mixtilinear-shaped closure plug having a cut out portion in one side thereof to receive the short arm of the L-shaped plate and having its outer portion flush with the outer periphery of the female member, an annular grove provided in the female member in juxtaposition with the opening therein, and a split sleeve received within the groove to hold the closure plug within the opening in the female member.

In testimony whereof I affix my signature.

EARL EDGAR CAMPBELL.